(12) United States Patent
Wigent, III

(10) Patent No.: US 7,611,997 B2
(45) Date of Patent: Nov. 3, 2009

(54) INTEGRAL 3-D FOAM CORE FABRICS, COMPOSITES MADE THEREFROM AND METHODS OF MAKING

(76) Inventor: Donald E. Wigent, III, 1608 Muirfield Dr., Greenville, NC (US) 27858

( * ) Notice: Subject to any disclaimer, the term of this patent is extended or adjusted under 35 U.S.C. 154(b) by 773 days.

(21) Appl. No.: 11/268,126

(22) Filed: Nov. 7, 2005

(65) Prior Publication Data

US 2006/0057920 A1    Mar. 16, 2006

Related U.S. Application Data

(63) Continuation-in-part of application No. 10/716,959, filed on Nov. 19, 2003, now abandoned.

(51) Int. Cl.
*B32B 5/18* (2006.01)
*D03D 11/00* (2006.01)
*D03D 15/00* (2006.01)

(52) U.S. Cl. ................ 442/221; 442/205; 442/208; 428/105

(58) Field of Classification Search ........... 442/181, 442/205, 208, 221; 428/105
See application file for complete search history.

(56) References Cited

U.S. PATENT DOCUMENTS

| | | | |
|---|---|---|---|
| 4,221,962 A | 9/1980 | Black | 250/227.25 |
| 4,400,642 A | 8/1983 | Kiraly | 310/332 |
| 4,537,469 A | 8/1985 | Kircher | 385/13 |
| 4,544,594 A * | 10/1985 | Li et al. | 428/92 |
| 4,581,527 A | 4/1986 | Crane | 250/227.14 |
| 4,603,252 A | 7/1986 | Malek | 564/474 |
| 4,772,092 A | 9/1988 | Hofer | 385/13 |
| 4,795,998 A | 1/1989 | Dunbar | 338/5 |
| 4,836,030 A | 6/1989 | Martin | 73/800 |
| 4,849,668 A | 7/1989 | Crawley | 310/328 |
| 4,891,511 A | 1/1990 | Reed | 250/227.16 |
| 5,023,845 A | 6/1991 | Crane | 73/800 |
| 5,029,977 A | 7/1991 | Wheeler | 385/123 |
| 5,103,504 A | 4/1992 | Dordevic | 2/243.1 |
| 5,118,931 A | 6/1992 | Udd | 250/227.16 |
| 5,182,449 A | 1/1993 | Johnson | 250/227.14 |
| 5,184,141 A | 2/1993 | Connolly | 345/705 |
| 5,195,046 A | 3/1993 | Gerardi | 702/35 |
| 5,210,499 A | 5/1993 | Walsh | 324/649 |
| 5,305,507 A | 4/1994 | Dvorsky | 29/25.35 |
| 5,338,928 A | 8/1994 | Jamieson | 250/227.21 |
| 5,440,300 A | 8/1995 | Spillman, Jr. | 340/10.34 |
| 5,493,390 A | 2/1996 | Varasl | 356/32 |
| 5,515,041 A | 5/1996 | Spillman, Jr. | 340/870.31 |
| 5,814,729 A | 9/1998 | Wu | 73/588 |
| 5,869,189 A | 2/1999 | Hagood, IV | 428/461 |
| 6,006,163 A | 12/1999 | Lictenwainer | 702/36 |
| 6,370,964 B1 | 4/2002 | Chang | 73/862.46 |
| 6,381,482 B1 | 4/2002 | Jayaraaman | 600/388 |
| 6,399,939 B1 | 6/2002 | Sundaresan | 250/231.1 |
| 6,529,127 B2 | 3/2003 | Townsend | 340/505 |
| 2001/0014565 A1* | 8/2001 | Qiu et al. | 442/221 |

* cited by examiner

*Primary Examiner*—Lynda Salvatore
(74) *Attorney, Agent, or Firm*—MacCord Mason PLLC

(57) ABSTRACT

A 3-D woven fabric having substantially elongated foam elements integrally formed therein during fabric formation for providing open corridors within the fabric. The fabric is preferably used for structural, stiffener, or component applications.

13 Claims, 3 Drawing Sheets

INTEGRAL 3-D FOAM CORE FABRICS, COMPOSITES MADE THEREFROM AND METHODS OF MAKING

CROSS-REFERENCE TO RELATED APPLICATIONS

The present invention is related to one or more co-pending US non-provisional applications; it is a continuation-in-part of U.S. patent Ser. No. 10/716,959 filed Nov. 19, 2003, which was published as U.S. Patent Application Publication No. 2005/0146076 now abandoned, which is incorporated herein by reference in its entirety.

BACKGROUND OF THE INVENTION (1) Field of the Invention

The present invention relates generally to weaving and, more particularly, to 3-D woven fabrics, and composites made therefrom, and methods of making same.

(2) Description of the Prior Art

Prior art cross-sectional shaped 3-D fabrics require looped selvage edges to secure the weft yarns during the fabric forming process, as set forth in U.S. Pat. No. 5,085,252 issued Feb. 4, 1992 to Mohamed et al. for a Method of forming variable cross-sectional shaped three-dimensional fabrics. Prior art provides for laminating 3-D and other fabrics with foam to form "sandwich" or foam core fabrics; however, delamination problems exist whenever more than one layer is stratified without being permanently connected or integrated with the foam layer.

Thus, there remains a need for a 3-D fabric having lightweight flexible core components integrally and unitarily formed with the fabric, wherein the core components include foam elements.

SUMMARY OF THE INVENTION

The present invention is directed to a 3-D fabric having flexible core components integrally and unitarily formed with the fabric, the flexible core components preferably formed from substantially elongate foam elements, which, if later removed form open channels, and methods of making the fabric. The present invention also provides composite materials formed from such fabrics.

These and other aspects of the present invention will become apparent to those skilled in the art after a reading of the following description of the preferred embodiment when considered with the drawings.

DETAILED DESCRIPTION OF THE PREFERRED EMBODIMENTS

Figure 1:
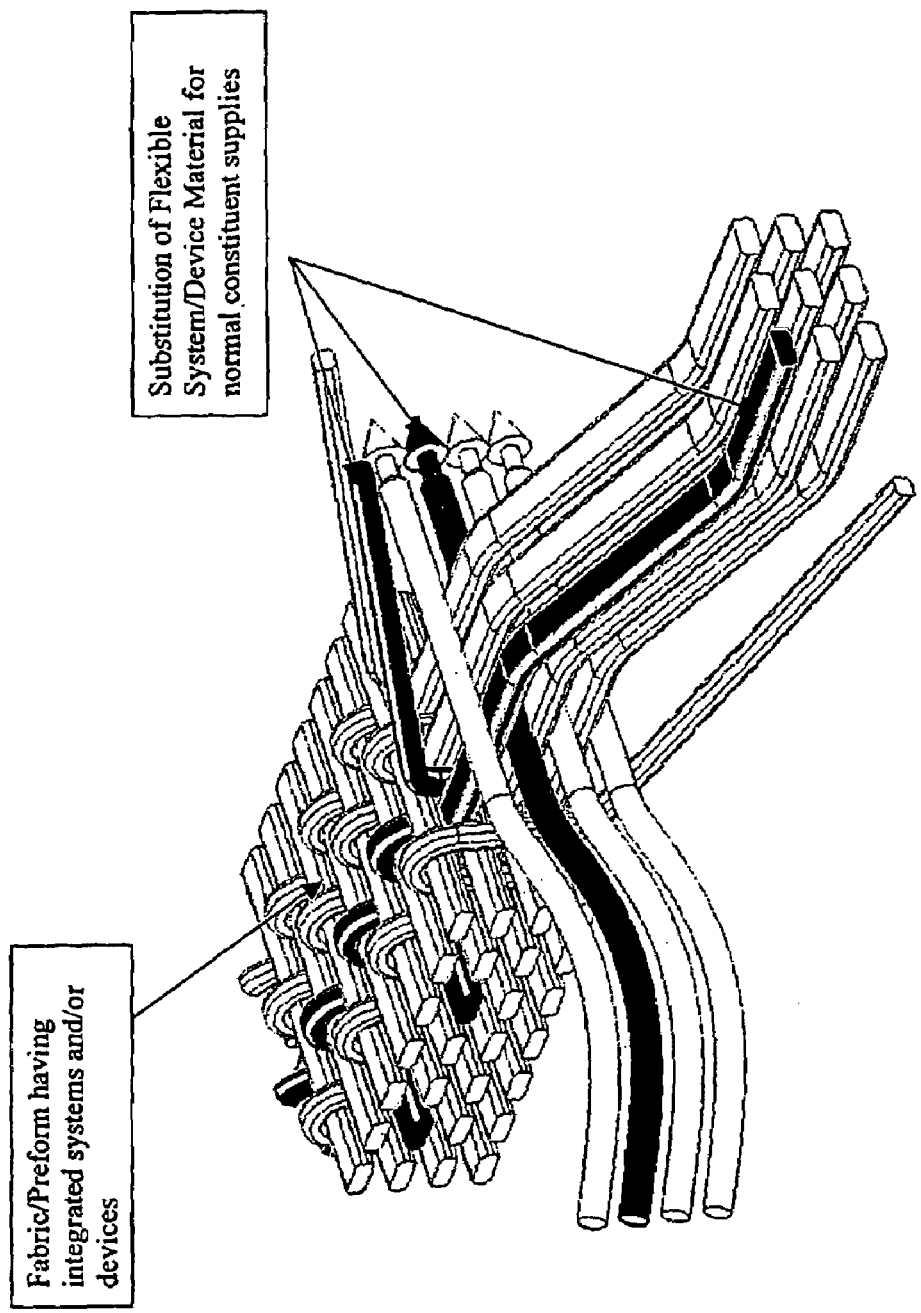
FIG. 1 is a perspective view of a fabric body constructed according to the present invention.

In the following description, like reference characters designate like or corresponding parts throughout the several views. Also in the following description, it is to be understood that such terms as "forward," "rearward," "front," "back," "right," "left," "upwardly," "downwardly," and the like are words of convenience and are not to be construed as limiting terms.

Referring now to the drawings in general, the illustrations are for the purpose of describing a preferred embodiment of the invention and are not intended to limit the invention thereto.

The present invention provides an integral, unitarily formed 3-D foam core fabric preferably using a 3-D woven fabrics having substantially elongated flexible elements or flexible core components included within the body of the fabric constructed and configured according to the present invention are preferably formed with substantially rectangular cross-sectional shapes and with a relatively thick z-direction dimension. In a preferred embodiment of the present invention the flexible core components are elongate foam elements. 3-D woven fabrics are known in the prior art, in particular being formed according to methods set forth in U.S. Pat. No. 5,085,252 issued Feb. 4, 1992 to Mohamed et al. for a Method of forming variable cross-sectional shaped three-dimensional fabrics, which is incorporated herein by reference in its entirety.

As best seen in FIG. 1, a 3-D fabric is shown having three substantially orthogonal yarn component systems in x-, y-, and z-directions, with the flexible core components or elongate foam elements being introduced in the y-direction or weft direction, preferably introduced during the weaving process. Alternatively, the foam elements may be introduced by substitution (FIG. 2) or attachment (FIG. 3).

The present invention provides for a 3-D woven fabric and methods of making the same, the fabric having a plurality of orthogonal yarn systems and corresponding yarn components thereof, including at least three directional systems: a warp, or x-direction; a weft, or y-direction; and a vertical or thickness corresponding to a z-direction, which are inserted into the fabric by reciprocation of a plurality of harnesses that separate and directed movement of the z-direction yarns by creating opposing groups for securing the warp and weft yarn systems in place with respect to each other, the entire fabric and its plurality of orthogonal yarn systems being secured at edges along the width of the fabric with respect to the fabric forming machine by selvage edges formed by interplacing the weft yarns with selvage yarns whose movement is independently directed by corresponding harnesses to create at least two opposing, compressive forces by selvage yarns against the thickness of weft and warp yarns forming the fabric body along regions at the fabric edges. According to the present invention, the flexible core components, which are preferably substantially elongate foam elements are preferably inserted in the weft direction.

The harness components of a weaving machine for making the 3-D woven fabric of the present invention are designed, constructed and positioned within the fabric forming machine for manipulating z-direction and selvage yarns such that the z-yarns form compressive forces against the collection of warp and weft yarns of the fabric body, and providing substantially perfectly vertically stacked y-direction or weft yarns, thereby securing them in position with respect to each other.

The integrally, unitarily formed 3-D foam core fabric of the present invention having substantially elongated foam elements inserted in at least one yarn component direction has a wide range of applications, including but not limited to structural composites, flooring, decking, vehicular and aircraft components, auto body parts, sporting goods and components, stiffeners for all applications, furniture, in particular upholstery fabrics with padding, gaskets and seals, radiators and heat exchangers, and the like.

Figure 2:
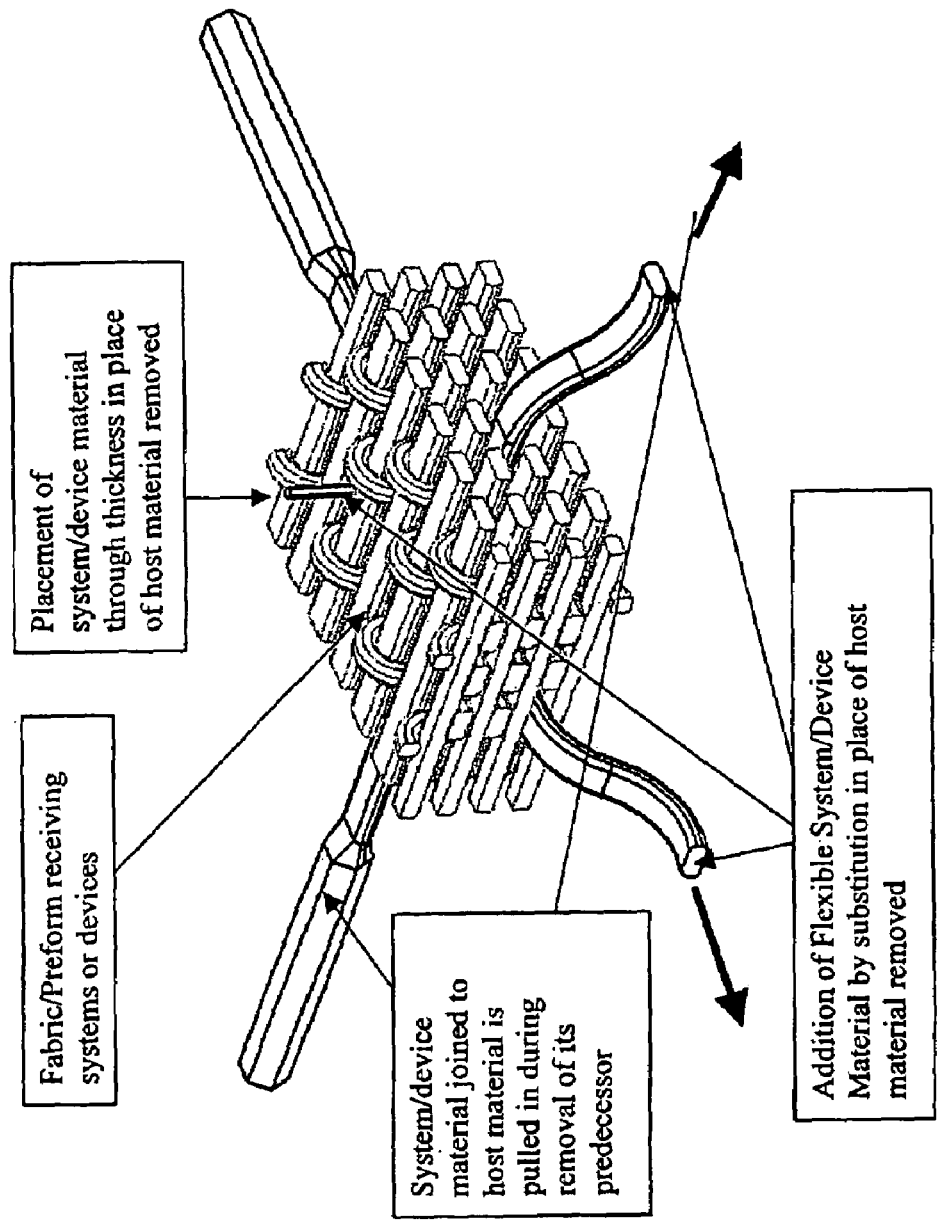
FIG. 2 is another perspective view of an alternative embodiment of the present invention.
Figure 3:
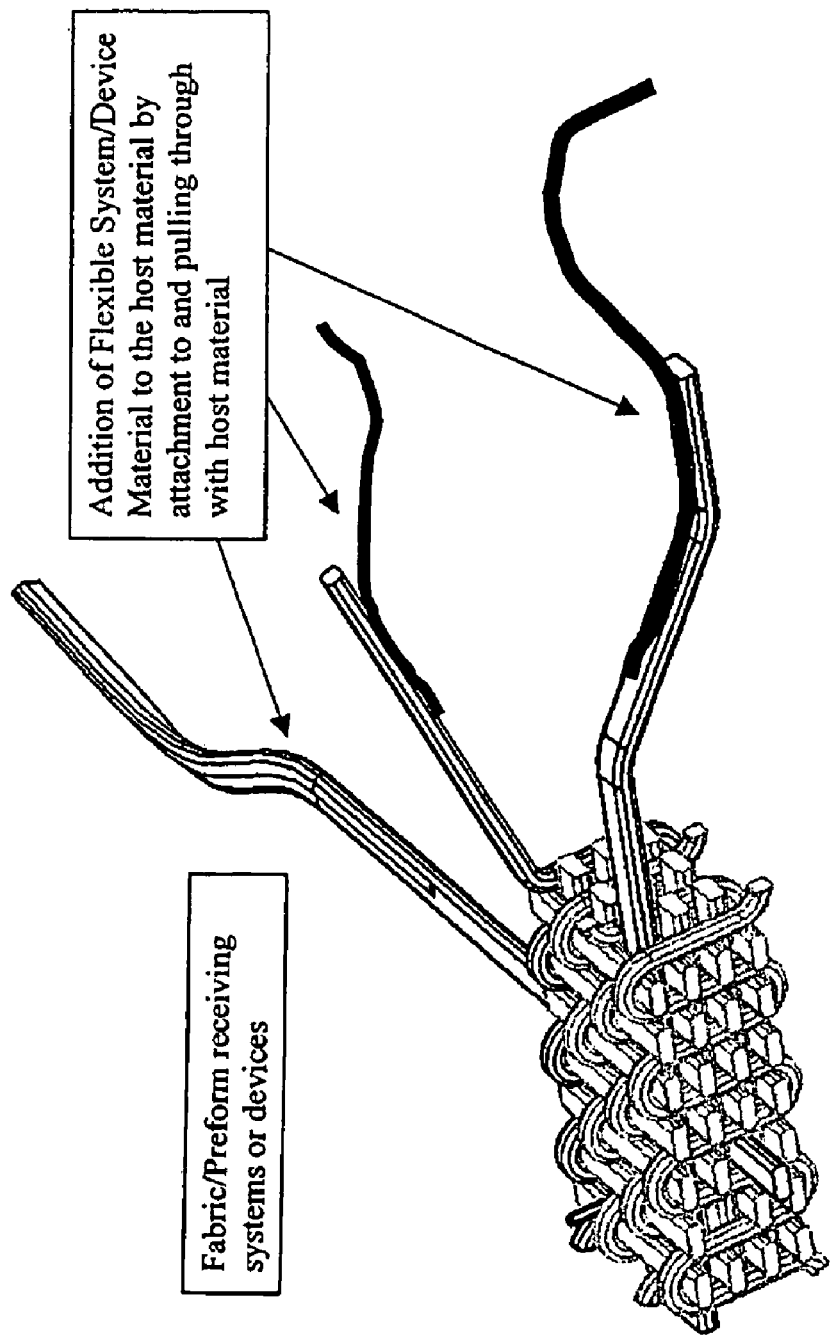
FIG. 3 is another perspective view of an alternative embodiment of the present invention.

Referring now to FIGS. 1, 2 and 3, the present invention provides a flexible system/device material as shown in a 3-D woven fabric, wherein the flexible material includes flexible core components or elongate foam elements that are introduced during the weaving process, as shown. Preferably, the flexible core components or elongate foam elements are used as one embodiment of the flexible elements set forth in the parent application, U.S. patent application Ser. No. 10/716,959, which is incorporated herein by reference in its entirety. Significantly, the fabric, which unitarily and integrally includes the flexible, elongated foam elements, forms both the skin and the core components that, in the prior art, are independently formed fabrics or layers that are subsequently laminated or layered together. By contrast to the prior art skin/core materials, the present invention provides an integrated sandwich structure with a specific type of core formed integrally and unitarily formed as part of the fabric during 3D weaving process from elongated foam elements. Thus, the present invention provides the complete sandwich structure, including both skin and core, with the foam core being integral part of the fabric formed with the fabric as part of the fabric during the 3-D weaving process; it is during the fabric formation or weaving that the elongated foam elements are introduced, not later, as with prior art. The core portion of the sandwich is formed by the foam elements, which are inserted into the fabric during formation, in the weft or y-direction.

In another embodiment of the present invention, a channel is formed only by the elimination of the foam elements from the core structure in a second step or additional processing after formation of the fabric and/or composite material. Where elimination of the flexible or foam elements is desired to form a channel, the foam may be removed or eliminated to create channels in a secondary step. This is optional and is done in a later step, following the fabric formation or weaving process.

The flexible, elongate foam elements preferably range between very thin, threadlike in diameter, to as coarse as about one inch diameter or higher. The only limitation is the shed space in the weaving process or insertion space for other types of fabric formation, which may be machine-dependent, or flexibility. Flexibility is important, inasmuch as it must be pulled through the opening for weft insertion; however, some stiffness may be acceptable, depending upon application of the fabric, so long as the capacity to introduce or manipulate the elements during fabric formation is possible. Preferably, the foam elements are lightweight, such that the density is nearly zero. Thus, the weight of the structure is approximately the weight of the fabric itself, i.e., the rest of the structure not including the foam elements. If a resin is infused between the foam, such as between the z-yarns, then the resin weight is included in the composite structure weight. The foam essentially adds no weight to the fabric, i.e., the fabric weight is substantially the same weight as the "skins" which is the rest of the fabric without the foam and/or the resin, which is added in the step of composite formation.

The present invention includes a integrally, unitarily formed 3-D material further comprising foam elements that are substantially elongated foam elements, more preferably slender foam elements, that are inserted during fabric formation in a manner that is similar to other yarn systems insertion. During the fabric formation, the elongated foam elements are inserted as a yarn component along with other yarns, or instead of other yarns, depending upon the specifications and functional requirements for the fabric, as well as the strength and features of the specific foam elements used.

These foam elements function to hold "open" corridors within the fabric, i.e., they provide lightweight channels within the fabric that may be further processed, removed, or otherwise eliminated from the body of the fabric.

As with traditional 3-D fabric formation for "true 3-D" materials or structures, the fabric is formed from a plurality of yarn systems that are mechanically manipulated to interact with each other. 3-D fabric types appropriate for the present invention include weaving, knitting, braiding, stitching, interlacing, interlocking, and the like; in any case, there is a requirement for modified equipment to manipulate the foam elements for insertion or inclusion during the fabric formation. By significant contrast to prior art foam core fabrics, the foam elements of the present invention are inserted during fabric formation and are unitarily and integrally formed with the fabric, not laminated therewith or between more than one layer of fabric.

For the preferred embodiment of a 3-D woven fabric having substantially orthogonal structural elements, the fabric includes x-, y-, z-direction yarn systems to form a unitary, integral single ply fabric with no lamination. A particular end application for this embodiment is as an insulating fabric within a structure. The fabric is flexible and/or compliant following the weaving process, although its integral, unitary formation eliminates delamination or separation of the foam elements, since they are part of the fabric structure itself, i.e., the yarn components include, are substituted, or are attached and replaced in at least one direction by the foam elements.

In another embodiment, a multi-ply fabric is provided through a sequencing fabric formation steps (by contrast to a single fabric formation in the case of a single ply fabric). One application for multi-ply 3-D fabrics having foam elements is as truss-like cored structures. Once again, within any fabric layer there is no delamination of the foam elements because they are integrally formed with the fabric.

Additional processing, such as, by way of example and not limitation, includes composites processing, surface treatments such as anti-skid, is optional. Also, the fabric may be constructed so that the foam elements provide for foam surfaces on at least one side of fabric.

Certain modifications and improvements will occur to those skilled in the art upon a reading of the foregoing description. By way of example and not limitation, the figures illustrate cross-sectional elements which are non-circular in cross-section; the present invention includes circular cross-sectional and/or non-circular cross-sectional elements, and combinations thereof. Also, in the figures, indication of flexible system/device material are directed to the foam elements. All modifications and improvements have been deleted herein for the sake of conciseness and readability but are properly within the scope of the following claims.

What is claimed is:

1. A three-dimensional (3-D) woven fabric comprising:
   a 3-D woven fabric formed from three independent, orthogonal yarn systems and corresponding components thereof, including a warp, x-direction components; a weft, y-direction components; and a vertical, thickness, z-direction components; and
   selvage edges formed by the weft yarns and selvage yarns;
   wherein at least one of the yarn components includes substantially elongate foam elements for providing lightweight foam core components within the fabric with the elongate foam elements being removed or eliminated after fabric formation to leave open channels within the fabric.

2. The fabric of claim 1, wherein the substantially elongate foam elements are inserted in the weft or y-direction.

3. The fabric of claim 1, wherein the substantially elongate foam elements are introduced to replace yarns in the weft or y-direction.

4. The fabric of claim 1, wherein the body of the fabric forms a substantially rectangular cross-sectional shape.

5. The fabric of claim 1, wherein the substantially elongate foam elements are at least partially flexible.

6. The fabric of claim 4, wherein the open channels are filled with a resin to form a composite structure.

7. The fabric of claim 1, wherein the fabric is treated with a resin to form a composite structure.

8. A composite material comprising:
a 3-D woven fabric formed from three independent, orthogonal yarn systems and corresponding components thereof, including a warp, x-direction components; a weft, y-direction components; and a vertical, thickness, z-direction components; and
selvage edges formed by the weft yarns and selvage yarns;
wherein at least one of the yarn components includes substantially elongate foam elements for providing lightweight foam core components within the fabric with the elongate foam elements being removed or eliminated after fabric formation to leave open channels within the fabric; and
wherein the fabric is infused with a resin and cured to form a rigid composite structure.

9. The composite material of claim 8, wherein the substantially elongate foam elements are inserted in the weft or y-direction.

10. The composite material of claim 8, wherein the substantially elongate foam elements are introduced to replace yarns in the weft or y-direction.

11. The composite material of claim 10, wherein the fabric has a substantially rectangular cross-sectional shape.

12. The fabric of claim 8, wherein the substantially elongate foam elements are at least partially flexible.

13. The fabric of claim 8, wherein the open channels are filled with resin during formation of the composite structure.

\* \* \* \* \*